United States Patent [19]

Takahashi et al.

[11] 4,234,466
[45] Nov. 18, 1980

[54] PROCESS FOR PREPARATION OF SOLID PIGMENT RESIN DISPERSION

[75] Inventors: Mitsuru Takahashi, Hirakata; Yukio Omori, Kobe; Shuji Ikeda, Osaka; Hiroyoshi Kataoka, Toyonaka, all of Japan

[73] Assignee: Nippon Paint Co., Ltd., Japan

[21] Appl. No.: 856,803

[22] Filed: Dec. 1, 1977

Related U.S. Application Data

[63] Continuation of Ser. No. 630,612, Nov. 10, 1975, abandoned, which is a continuation of Ser. No. 406,173, Oct. 12, 1973, abandoned.

[30] Foreign Application Priority Data

Oct. 14, 1972 [JP] Japan .............................. 47-103103

[51] Int. Cl.$^2$ .......................... C08L 1/14; C08L 1/28
[52] U.S. Cl. ........................... 260/17 A; 204/159.11; 260/42.53; 260/42.54; 525/481
[58] Field of Search .............. 260/17 A, 42.53, 42.54, 260/873; 525/481

[56] References Cited

U.S. PATENT DOCUMENTS

| | | | |
|---|---|---|---|
| 2,171,765 | 9/1939 | Röhm et al. | 260/17 R |
| 2,839,479 | 6/1958 | Caldwell et al. | 260/17 |
| 3,054,762 | 9/1962 | Rees | 260/17 |
| 3,298,979 | 1/1967 | Hagemeyer et al. | 260/17 |
| 3,734,872 | 5/1973 | Wakimoto et al. | 260/47.7 P |
| 3,759,875 | 9/1973 | Guthrie | 260/76 |
| 3,784,491 | 1/1974 | Pozorski | 260/8 |
| 3,878,139 | 4/1975 | Takahashi et al. | 260/17 A |
| 3,932,562 | 1/1976 | Takahashi | 260/873 |
| 3,932,562 | 1/1976 | Takahashi | 260/873 |
| 4,060,511 | 11/1977 | Sinclair | 260/42.53 |

OTHER PUBLICATIONS

Chem. Absts., 72:56340q, "Synthetic Pigments—Materials", Newland.
Chem. Absts. 67:33320r, "Homogeneous Pigment Dispersion in Polymers", Imp. Chem. Ind., Ltd.
Chem. Absts. 77:116,173 c, "Finely Divided Pigment Dispersions", Wakimoto et al., (Germ. Offen. 2,145,950; Jul. 6/72).

*Primary Examiner*—Edward M. Woodberry
*Attorney, Agent, or Firm*—Wenderoth, Lind & Ponack

[57] ABSTRACT

A process for preparing a solid pigment dispersed composition which comprises subjecting a liquid composition comprising at least one ethylenically unsaturated polymerizable compound, at least one resin dissolved or dispersed therein and at least one pigment dispersed therein to suspension or bulk polymerization, if necessary, with previous color matching.

14 Claims, No Drawings

PROCESS FOR PREPARATION OF SOLID PIGMENT RESIN DISPERSION

This is a continuation, of application Ser. No. 630,612, filed Nov. 10, 1975, now abandoned, which in turn is a continuation of Ser. No. 406,173, filed Oct. 12, 1973, now abandoned.

The present invention relates to a novel process for preparation of a solid pigment dispersed composition. It also relates to a novel process for preparation of a color matched solid pigment dispersed composition.

For preparation of a solid pigment dispersed composition comprising a resin and a pigment dispersed therein, there has been adopted a process which comprises dispersing a pigment into a solution of a resin in a solvent by the aid of a dispersing machine and evaporating the solvent from the resultant dispersion. There has also been adopted a process which comprises crushing and admixing a resin and a pigment by the aid of a crusher and dispersing the resultant mixture while melting by the aid of a hot kneader, an extruder or a hot roller mill. These conventional processes, however, have certain disadvantages. In the former process, for instance, an expensive apparatus for vacuum distillation is required for elimination of the solvent from the dispersion. Further, the recovery of the evaporated solvent is essential not only for prevention of air pollution but also for lowering the cost. In addition, it has a danger of fire, particularly when adopted on a large scale. In the latter method, for instance, the achievement of a satisfactory and sufficient dispersed state of a pigment in high polymers is difficult due to their high melt viscosity. It is almost impossible to obtain such a fine and uniform dispersion of a pigment as in the case of a paint of solvent type by the use of a conventional dispersion equipment such as an extruder or a hot kneader. Thus, the use of an expensive apparatus and the adoption of complicated operations are essential.

On the other hand, the color matching of a solid coating composition has heretofore been effected by admixing two or more kinds of solid compositions containing a pigment dispersed therein, which are previously melted or dissolved in suitable solvents. After the proportion of the components in a solid coating composition having a desired color is once determined, the preparation of the solid coating composition may be carried out by admixing the components all at once in the determined proportion rather than preparing two or more kinds of solid pigment dispersed compositions and admixing them, because the former requires fewer mixing operations which operations require an expensive mixing apparatus and this is more economical than the latter. However, the properties of pigments as well as the degree of dispersion are more or less varied with the lots. Therefore, the mixing of the solid pigment dispersed compositions is necessary to assure the obtention of a solid coating composition having the substantially same color as a desired color standard.

As the result of extensive study, it has now been found that the suspension or bulk polymerization of a liquid composition comprising an ethylenically unsaturated polymerizable compound, a resin dissolved or dispersed therein and a pigment dispersed therein does not result in any noticeable coagulation of the particles and can afford a solid composition containing the pigment in a good dispersing state. It has also been found that a certain constant and stable relationship is present between the color of the coating prepared by the use of a liquid composition color matched in the liquid state and the color of the coating prepared by the use of a solid composition color matched in the solid state, the said solid composition being the one obtained using the same pigments as used in the said liquid composition. By the utilization of such relationship, it has been made possible to obtain a solid coating composition having the substantially same color as a desired color standard by color matching in the liquid state.

A main object of the present invention is to embody a novel process for preparation of a solid pigment dispersed composition which solves the said problems seen in conventional processes and assures a satisfactory and sufficient dispersed state of the pigment and the resin by the use of a usual dispersing machine conventionally employed for production of paints of the solvent type.

Another object of this invention is to embody a method for color matching which overcomes the drawbacks as present in conventional methods and achieves this object in a quite simple manner.

These and other objects of the invention will be apparent to those conversant with the art from the foregoing and subsequent descriptions.

According to the present invention, there is provided a process for preparation of a solid pigment dispersed composition which comprises subjecting a liquid composition comprising at least one ethylenically unsaturated compound, at least one resin dissolved or dispersed therein and at least one pigment dispersed therein to suspension or bulk polymerization, if necessary, with previous color matching.

The liquid composition to be subjected to polymerization in the process of this invention comprises essentially at least one ethylenically unsaturated polymerizable compound, at least one resin and at least one pigment.

Examples of the ethylenically unsaturated polymerizable compound to be used for giving excellent properties to the objective solid pigment dispersed composition are as follows: (1) monovinylic aromatic hydrocarbons (e.g. styrene, vinyltoluene, p-t-butylstyrene), (2) ethylenically unsaturated carboxylic acid esters (e.g. ethyl acrylate, n-butyl acrylate, isobutyl acrylate, t-butyl acrylate, 2-ethylhexyl acrylate, dodecyl acrylate, methyl methacrylate, ethyl methacrylate, n-butyl methacrylate, isobutyl methacrylate, t-butyl methacrylate, 2-ethylhexyl methacrylate, lauryl methacrylate), (3) acrylonitrile and methacrylonitrile, (4) glycidyl vinyl compounds (e.g. glycidyl acrylate, glycidyl methacrylate), (5) ethylenically unsaturated compounds having at least one hydroxyl group (e.g. 2-hydroxyethyl acrylate, 2-hydroxypropyl acrylate, 1-methyl-2-hydroxyethyl acrylate, 2-hydroxyethyl methacrylate, 2-hydroxypropyl methacrylate, 1-methyl-2-hydroxyethyl methacrylate, polypropylene glycol monomethylacrylate, glycerol monomethylacrylate, 3-chloro-2-hydroxypropyl methacrylate), (6) ethylenically unsaturated carboxylic acids (e.g. acrylic acid, methacrylic acid, crotonic acid, itaconic acid, fumaric acid, maleic acid), (7) ethylenically unsaturated amines (e.g. acrylamide, N-methylolacrylamide, alkyl ether N-methylolacrylamide (the alkyl moiety having 1 to 14 carbon atoms), diacetone acrylamide, hydroxymethyldiacetone acrylamide, N-methylolmethacrylamide, alkyl ether N-methylol methacrylamide (the alkyl moiety having 1 to 14 carbon atoms), (8) ethylenically unsaturated compounds having at least one blocked isocyanate group such as the addition product between a polyisocyanate compound (e.g. hexamethylene diisocyanate, tolylene diisocyanate, isophorone diisocyanate, polyisocyanate adduct) having at least one free isocyanate group and at least one isocyanate group blocked by a conventional blocking agent (e.g. phenols, lactams, active methylene compounds, alcohols, amines, oximes) and an ethylenically unsaturated compound having at least one hydroxyl group (e.g. 2-hydroxyethyl methacrylate, 2-hydroxyethyl acrylate, 2-hydroxypropyl methacrylate, acrylic acid, methacrylic acid, itaconic acid, N-methylolacrylamide) and the addition product between an ethylenically unsaturated compound having at least one free isocyanate group and a blocking agent, (9) other ethylenically unsaturated polymerizable monomers (e.g. vinyl acetate, vinyl propionate, methoxyethyl acrylate, ethoxyethyl acrylate, butoxyethyl acrylate, an adduct of a fatty acid with glycidyl acrylate or glycidyl methacrylate, vinylpyrrolidone, vinylpyridine, vinylimidazole, N,N'-dimethylaminoethyl methacrylate, dibutyl fumarate, maleic anhydride), etc. These ethylenically unsaturated polymerizable compounds may be used in an amount of 27 to 96% by weight of the total weight of the liquid composition.

As the resin being able to be dissolved or dispersed in the said ethylenically unsaturated compound, there may be exemplified natural resins, rosin esters, cellulose derivatives (e.g. cellulose acetate, cellulose acetate butyrate, cellulose acetate propionate, cellulose methyl ether, cellulose ethyl ether), xylene resins, toluene resins, petroleum resins, silicon resins, polyurethane resins, phenol resins, aminoplast resins, epoxy resins, blocked polyisocyanate resins, acrylic or methacrylic resins having or not a functional group such as hydroxyl group, carboxyl group, epoxy group, amide group or blocked isocyanate group, resins having at least one active group being able to be grafted with the ethylenically unsaturated compound such as an ethylenically unsaturated group, a C—H bond of which the active hydrogen can be abstracted by a free radical or a mercapto group (e.g. an alkyd resin or a cellulose derivative in which a dicarboxylic anhydride such as tetrahydrophthalic anhydride, methyltetrahydrophthalic anhydride, hexahydrophthalic anhydride or maleic anhydride is incorporated in the structure, an alkyd resin or a cellulose derivative into which a mercapto group is introduced by the condensation of the hydroxyl group with a mercaptocarboxylic acid such as thioglycollic acid). These resins may be used in an amount of 3 to 60% by weight of the total weight of the liquid composition. When the amount is smaller than 3% by weight, the maintenance of a good dispersed state of the pigment is difficult. When the amount is larger than 60% by weight, the viscosity is so increased as making the processing or operation difficult.

As the pigment to be used in the invention, there may be employed usual dry pigments, flushed pigment, color chips and the like. In other words, there may be employed any pigment used for commercially available paints, inks, plastics and the like. Examples of the pigments are inorganic pigments such as pigments mainly consisting of elements alone (e.g. carbon black, aluminum powder) and oxides, sulfates, sulfides, chromates, silicates, hydroxides and carbonates of metals such as zinc, lead, titanium, antimony, cadmium, iron, arsenic, magnesium, aluminum, barium, calcium, silicon, cobalt and chromium, organic pigments such as natural dyes, nitroso pigments, nitro pigments, azo pigments, phthalocyanine pigments, basic dyes, acidic dyes, vat dyes, mordant dyes, quinacridone red, quinacridone violet, perylene red, perylene scarlet, isoindolinone yellow, dioxazine violet, aniline black and organic fluorescent pigments, etc. In the selection of a suitable pigment from them, it should be taken into consideration that the pigment does not cause any side reaction with the resin and the ethylenically polymerizable compound during the storage and the polymerization. The amount of the pigment may be 1 to 70% by weight of the total weight of the liquid composition. When the amount is smaller than 1% by weight, a sufficient coloring cannot be attained. When the amount exceeds 70% by weight, the processing or operation may be difficult due to the increase of the viscosity.

For the mixing of the ethylenically unsaturated polymerizable compound, the resin and the pigment to make a uniform dispersion, there may be used a conventional dispersing machine usually employed for preparation of paints, inks and the like such as a roller mill, a colloid mill, a fluid energy mill, an oscillation ball mill, a ball mill or a sand grinder.

The mixing may be carried out under the substantially same conditions as in the production of ordinary paints of solvent type. The mixing time is dependent on the kind of the dispersing machine used and the required degree of dispersion. When desired a polymerization inhibitor such as hydroquinone or 2,2'-diphenyl-1-picrylhydrazile may be incorporated into the mixture so as to prevent the polymerization of the ethylenically unsaturated polymerizable compound. However, the incorporation of such polymerization inhibitor is not necessarily required when the mixing operation is not influenced even by the progress of the polymerization to a certain extent during the mixation. In the mixture, there may be also incorporated any additive usually employed in the preparation of paints, inks and the like such as a pigment, a moisturizing agent, a flow controlling agent, a curing agent or an antioxidant in the course of or before or after the mixation in such an amount that the subsequent suspension or bulk polymerization is not hindered by the incorporation.

Still, the mixing may be started with a mixture not containing any resin insofar as the polymerization of the ethylenically unsaturated polymerizable compound proceeds to a certain extent during the mixing to afford a resin so that a liquid composition comprising the ethylenically unsaturated polymerizable compound, the resin and the pigment is finally obtained. Further, in some cases, the liquid composition may be prepared by dissolving a dispersion comprising the resin and the pigment dispersed therein such as flushed pigment or color chip in the ethylenically unsaturated polymerizable compound.

The thus prepared liquid composition is then subjected to suspension or bulk polymerization. Prior to the polymerization, two or more kinds of the liquid compositions may be mixed for color matching as hereinafter described.

The polymerization may be effected in a per se conventional manner, usually in the presence of a polymerization initiator such as a peroxide (e.g. benzoyl peroxide, lauroyl peroxide) or an azobisnitrile (e.g. azobisisobutyronitrile, 2,2'-azobis-2,4-dimethylvaleronitrile) as well as a chain transfer agent such as a mercaptan (e.g. t-dodecylmercaptan), a disulfide (e.g. diisopropylxanthogendisulfide) or a halide.

The suspension polymerization may be carried out at 50° to 100° C. (preferably from 60° to 90° C.) for 3 to 20 hours (preferably 5 to 15 hours). The bulk polymerization may be effected at 60° to 160° C. (preferably from 80° to 140° C.) for 2 to 20 hours (preferably 4 to 15 hours).

As the suspension stabilizer to be used in the suspension polymerization, there may be exemplified a natural high polymer or its derivative (e.g. gelatin, tragacanth, starch, methylcellulose, hydroxypropylcellulose, hydroxypropylmethylcellulose, carboxylmethylcellulose), a vinyl alcohol copolymer (e.g. polyvinylalcohol, partially saponified polyvinylalcohol), a synthetic high polymer (e.g. polyacrylic acid salts, polymethacrylic acid salts, polyacrylamide), a hardly soluble salt (e.g. barium sulfate, calcium sulfate, barium carbonate, calcium carbonate, magnesium carbonate, calcium phosphate), an inorganic high polymer (e.g. talc, bentonite, silicic acid, diatomaceous earth, clay), a metal powder, a metal oxide, etc. In addition to such stabilizer, a salt such as sodium chloride, potassium chloride or sodium sulfate or a surface active agent may be used as the stabilization promoter. By the use of these compounds, the suspension polymerization can be accomplished with a good stability to give the spherical product.

The product is isolated from the reaction mixture, washed and dried to give the objective solid pigment dispersed composition, which may be preferably crushed into powders for the practical use. When the solid pigment dispersed composition is tacky at room temperature, it may be used in a blocked form.

In the present invention, the liquid composition comprising not only the ethylenically unsaturated polymerizable compound but also the resin and the pigment is subjected to suspension polymerization, and a higher stability of the suspended particles is assured during the reaction and the product having a larger particle size can be obtained in comparison with usual suspension polymerizations using solely one or more ethylenically unsaturated polymerizable compounds. These are of great advantage, because the polymerization can proceed smoothly and the washing of the product can be performed with ease. It may be also considered advantageous that the liquid composition is viscous, because the ethylenically unsaturated polymerizable compound having a functional group such as carboxyl, hydroxyl, hydroxymethyl or alkoxymethyl and being soluble in water is prevented from the removal into an aqueous phase during the suspension polymerization, which may result in lowering the loss of the starting materials and maintaining a good stability of the suspended particles. Particularly notable is that the pigment dispersed in the liquid composition is not coagulated during the suspension polymerization and, therefore, a good dispersion state of the pigment at the beginning can be maintained in the solid pigment dispersed composition as produced.

In case of the bulk polymerization, the control of the temperature during the reaction is rather difficult, and care should be taken in regulating the temperature to block side reactions such as the reaction between the functional groups in the resin and the ethylenically unsaturated polymerizable compound. The prevention of the side reactions may be also achieved by the addition of any reaction preventing agent such as a chain transfer agent. The selection and use of the starting materials which do not substantially cause any side reactions are, of course, favorable.

For preparation of a color matched solid pigment dispersed composition, two or more kinds of the liquid compositions prepared by the procedure as hereinbefore described are admixed to make a color matched liquid composition and then the latter is subjected to suspension or bulk polymerization as hereinabove illustrated.

In this case, the coating film for color matching may be prepared by any one of the following procedures: (1) applying the color matched liquid composition on a panel and evaporating off the volatile components to form a coating film; (2) admixing the color matched liquid composition with a designed amount of a resin, applying the resultant mixture on a panel and evaporating off the volatile components to form a coating film; (3) applying the color matched liquid composition, if necessary, admixed with a designed amount of a curing composition or a curing promoter on a panel and subjecting the panel to a curing process such as heating or irradiation of ultraviolet rays or electron beam to form a coating film, etc.

The procedure (1) is effective in the case that the ratio of the pigment to the resin in the color matched liquid composition is small. When the content of the pigment is large or the resin is tacky, the adoption of the procedure (1) is not desirable. In the procedure (2), the resin to be additionally employed is favored to have a compatibility to the resin in the color matched liquid composition. The addition of such resin is effective for maintenance of an appropriate content of the pigment in the coating film and for improvement of the strength and the drying of the coating film. The curing composition to be optionally employed in the procedure (3) may consist of a resin having a carboxyl group, a hydroxyl group or an epoxy group (e.g. alkyd resin, acrylic copolymer, methacrylic copolymer) and a curing agent (e.g. aminoplast resin, blocked polyisocyanate, polyisocyanate, polycarboxylic acid, epoxy resin), when the curing is effected under heating. Alternatively, it may consist of a compound having at least two ethylenically unsaturated groups (e.g. diallyl phthalate, diallyl maleate, divinylbenzene triallyl isocyanate, polyethylene glycol dimethacrylate, alkyd resin or acrylic acid or methacrylic copolymer having at least two ethylenically unsaturated groups) and a peroxide (e.g. t-butyl perbenzoate, di-t-butyl peroxide, benzoyl peroxide). The curing is carried out at 50° to 200° C. in the presence of such curing composition. In case of curing by ultraviolet ray irradiation, there may be used a curing composition comprising a light sensitizer (e.g. benzophenone, benzoin, benzoin ether, benzil disulfide, 2,4-dichlorobenzaldehyde, azo compound) and, if necessary, a compound having at least one ethylenically unsaturated group. The curing is carried out by applying on the coating an ultraviolet ray of 200 to 500 mμ in wave length with a suitable light source such as a carbon arc lamp, a mercury vapor lamp or a xenon lamp. The irradiation conditions may be appropriately selected depending on the kind of the composition. In case of curing by electron beams, the addition of a curing composition as above mentioned is usually not required, but if necessitated, a compound having at least one ethylenically unsaturated group may be employed. The curing can be accomplished by application of electron beam on the coating for about 1 second under an acceleration voltage of about 300 KV by the use of an electron beam accelerator.

In the color matching, there must be employed a color standard panel and a coated panel for color inspection which are prepared by the identical procedure for preparation of the coating film as mentioned above.

The following are typical examples of the preparation of a color standard panel [hereinafter referred to as "color standard panel (2)"] by the use of an original color standard and of the color matching using the same.

Each of two or more kinds of the liquid compositions (i.e. color pastes for tinting), if necessary, admixed with an additional amount of the ethylenically unsaturated polymerizable compound so as to make the vehicle composition therein coincident with that in the solid pigment dispersed composition to be ultimately obtained, is subjected to suspension or bulk polymerization as hereinbefore explained, to prepare a solid pigment dispersed composition for tinting. The thus produced solid compositions are, after incorporation of a curing agent or any other additive in designed amounts, admixed with each other in a melt state or a state of dispersion in a suitable solvent, and the resulting color matched composition is applied on a panel to form a coating film. This panel is hereinafter referred to as the "color standard panel (1)".

From the proportion of the solid pigment dispersed compositions for tinting used in the preparation of the color standard panel (1), the proportion of the color pastes for tinting as initially used is calculated.

In the thus calculated proportion, the liquid compositions are admixed, and the resulting mixture is used for the preparation of a coated panel in the same manner as hereinbefore described for the preparation of a coating film for color matching. The thus prepared coated panel is hereinafter referred to as the "color standard panel (2)".

Besides, a mixture of the liquid compositions in the above calculated proportion is subjected to suspension or bulk polymerization as hereinbefore explained to prepare a color matched solid pigment dispersed composition. This solid composition is then admixed with a curing agent or any other additive to make a color matched solid paint composition, which is applied on a panel and baked to prepare a coated panel. The thus prepared coated panel is hereinafter referred to as the "color standard panel (3)".

In the process of this invention, the degree of dispersion of the pigment before the polymerization can be maintained after the polymerization so that the colors of the color standard panels (1) and (3) are substantially identical to each other. By effecting the preparation of the color standard panel (2) under a constant condition, a certain interrelation arises between the color standard panels (2) and (3). Therefore, the color matching can be made at the stage of the liquid composition by referring to the color standard panel (2).

Still, in the color matching to the color standard panel (2), the materials directly taken from the color matched liquid composition may be used for the preparation of a coated panel for color inspection. By confirming the coincidence in color between the coated panel thus prepared and the color standard panel (2), the composition of the same lot as above may be subjected to polymerization, whereby the error in weighing can be eliminated and the production of a solid coating composition can be accomplished with the same rapidity and accuracy as in the production of a liquid coating composition.

The solid pigment dispersion composition prepared by this invention may be used for coloring of plastic materials, powdery paints and the like or used as such a powdery paint.

Practical and presently preferred embodiments of the invention are illustratively shown in the following Examples in which parts are by weight.

EXAMPLE 1

An acrylic copolymer prepared by the copolymerization of methyl methacrylate, styrene, isobutyl methacrylate, butyl acrylate and methacrylic acid in a proportion of 37:23:15:15:10 by weight and having a weight average molecular weight of 35,000 (44 parts) is dissolved in a mixture consisting of methyl methacrylate (15.12 parts), styrene (8.28 parts), isobutyl methacrylate (3.6 parts), glycidyl methacrylate (7.2 parts) and n-butyl acrylate (1.8 parts), and titanium white, i.e. "R-CR-3 Titanium White" (trade name; manufactured by British Titanium Product Co., Ltd.) (20 parts) is dispersed therein by the aid of a sand grinder so as to make the particle size of the pigment $10\mu$ or less. To the resultant dispersion (50 parts), t-dodecylmercaptan (0.54 part) and 2,2'-azobis-2,4-dimethylvaleronitrile (0.72 part) are added and dissolved uniformly. The obtained liquid composition is placed into a 1 liter volume reaction vessel equipped with a stirrer, a thermometer, a cooler and an inlet for nitrogen in which a 0.4% aqueous solution of hydroxypropylmethylcellulose (150 parts) has been previously charged, and the contents are stirred under nitrogen stream to disperse the liquid composition in water. The temperature is elevated to 70° C. in about 15 minutes, and stirring is continued at 70° C. for 5 hours. After cooling, the dispersed phase is collected by filtration, washed with water and dried to give a solid pigment dispersed composition as beads of 0.1 to 0.5 mm in particle size. The particle size of the pigment is $10\mu$ or less, when determined on a butyl acetate solution of solid pigment dispersed composition. Thus, it is confirmed that the coagulation has not taken place.

The solid pigment dispersed composition is pulverized into powder and passed through a sieve of 150 mesh. The obtained powder is applied on a polished steel plate by electrostatic coating and baked at 200° C. for 20 minutes. The fluidity during baking is good. The obtained coating film is smooth and lustrous and has good solvent resistance to acetone and xylene.

EXAMPLE 2

A powdery dispersion (51 parts) consisting of a polyester resin prepared by the condensation of phthalic anhydride, thioglycollic acid, trimethylolpropane and neopentylglycol in a proportion of 55:5:28:19.7 by weight and having $4.5 \times 10^{-4}$ g equivalent/g of mercapto groups [hereinafter referred to as "resin (A)"] and titanium oxide, i.e. "Tipure R-900" (trade name; manufactured by Dupon Co., Ltd.), dispersed in the polyester resin in an amount of 60% by weight, the particle size of the pigment being $10\mu$ or less, is dissolved in a mixture consisting of methyl methacrylate (28 parts), styrene (7 parts), 2-hydroxyethyl methacrylate (7 parts) and n-butyl acrylate (7 parts), and t-dodecylmercaptan (2.6 parts) and benzoyl peroxide (2 parts) are added thereto to make a uniform dispersion. The obtained liquid composition is placed into the same reaction vessel as in Example 1 in which a 0.25% aqueous solution of hydroxypropylmethylcellulose (300 parts) has been previously charged. The contents are stirred under nitrogen stream to disperse the liquid composition in water. The temperature is elevated to 70° C. in about 15 minutes, and stirring is continued at 70° C. for 5 hours. After cooling, the dispersed phase is collected by filtration, washed with water and dried to give a solid pigment dispersed composition as beads of 0.1 to 0.5 mm in particle size. The particle size of the pigment is 10µ or less, when determined on a butyl acetate solution of the solid pigment dispersed composition. Thus, it is confirmed that coagulation has not taken place.

The solid pigment dispersed composition is pulverized into powders and passed through a sieve of 150 mesh. The obtained powders are applied on a polished steel plate by the electrostatic coating and baked at 200° C. for 15 minutes. The fluidity during baking is good. The obtained coating film is smooth and lustrous.

EXAMPLE 3

An acrylic copolymer prepared by the copolymerization of methyl methacrylate, styrene, isobutyl methacrylate, butyl acrylate and glycidyl methacrylate in a proportion of 42:23:15:5:15 by weight and having a weight average molecular weight of 13,000 (45 parts) is dissolved in a mixture of consisting of methyl methacrylate (18.9 parts), styrene (10.35 parts), isobutyl methacrylate (6.75 parts), glycidyl methacrylate (6.75 parts) and n-butyl acrylate (2.25 parts), and phthalocyanine blue, i.e. "Cyanine Blue 700-8" (trade name; manufactured by Toyo Ink Co., Ltd.), (8.5 parts) is dispersed therein by the aid of a roller mill to make the particle size of the pigment 10µ of less. To the resultant dispersion (50 parts), t-dodecylmercaptan (1.35 parts) and 2,2'-azobis-2,4-dimethylvaleronitrile (1.8 parts) are added and dissolved uniformly. The obtained liquid composition is placed into the same reaction vessel as in Example 1 in which a 1% aqueous dispersion of zinc white (200 parts) has been previously charged. The contents are stirred under nitrogen stream to disperse the liquid composition into water. The temperature is elevated up to 60° C. in about 15 minutes, and stirring is continued at 60° C. for 3 hours and then at 70° C. for 3 hours. After cooling, the dispersed phase is collected by filtration, washed with water and dried to give a solid pigment dispersed composition as beads of 0.2 mm or less in particle size. The particle size of the pigment is 10µ or less, when determined on a butyl acetate solution of the solid pigment dispersed composition. Thus, it is confirmed that coagulation has not taken place.

The solid pigment dispersed composition is treated in the same manner as in Example 2 to form a coating film. The fluidity during baking is good, and the obtained coating film is smooth and lustrous.

EXAMPLE 4

An acrylic copolymer as in Example 3 (90 parts) is dissolved in a mixture consisting of methyl methacrylate (33.3 parts), styrene (20.7 parts), isobutyl methacrylate (13.5 parts), methacrylic acid (9 parts) and n-butyl acrylate (13.5 parts), and "Cralor Orange YKO-789D" (trade name; manufactured by Dupont Co., Ltd.) (7.28 parts), "R-CR-3 Titanium White" (1.82 parts) and "Oriental First Red FBW" (trade name; manufactured by Fuji Pigments Co., Ltd.) (10.9 parts) are dispersed wherein by the aid of a ball mill to make the particle size of the pigment 10µ or less. To the resultant dispersion (100 parts), t-dodecylmercaptan (5.4 parts) and 2,2'-azobis-2,4-dimethylvaleronitrile (3.6 parts) are added and dissolved uniformly. The obtained liquid composition is placed into the same reaction vessel as in Example 1 in which a 0.5% aqueous solution of hydroxypropylmethylcellulose (300 parts) has been previously charged. The contents are stirred under nitrogen stream to disperse the liquid composition into water. The temperature is elevated to 70° C. in about 10 minutes, and stirring is continued at 70° C. for 7 hours. After cooling, the dispersed phase is collected and treated as in Example 1 to give a solid pigment dispersed composition as beads of 0.2 mm or less in particle size. The particle size of the pigment is 10µ or less, when determined on a butyl acetate solution of the solid pigment dispersed composition. Thus, it is confirmed that coagulation has not taken place.

The solid pigment dispersed composition is treated in the same manner as in Example 1 to form a coating film. The fluidity during baking is good, and the obtained coating film is smooth and lustrous and shows a good solvent resistance to acetone and xylene.

EXAMPLE 5

Cellulose acetate butyrate, i.e. "EAB-451-1" (trade name; manufactured by Eastman Chemical Products Co., Ltd.), (18 parts) is dissolved in a mixture of methyl methacrylate (54 parts) and n-butyl acrylate (24 parts), and titanium white, i.e. "Tipake R-820 Titanium White" (trade name; manufactured by Ishihara Sangyo Co., Ltd.), (80 parts) is dispersed therein by the aid of a ball mill to make the particle size of the pigment 10µ or less. To the resultant dispersion (176 parts), styrene (12 parts), 2-hydroxyethyl methacrylate (12 parts), t-dodecylmercaptan (3 parts) and azobisisobutyronitrile (4.0 parts) are added and dissolved uniformly. The liquid composition is placed into the same reaction vessel as in Example 1 in which a 1.5% aqueous solution of barium sulfate (700 parts) has been previously charged. The contents are stirred under nitrogen stream to disperse the liquid composition into water. The temperature is elevated to 60° C. in about 10 minutes, and stirring is continued at 60° C. for 10 hours. After cooling, the dispersed phase is collected and treated as in Example 1 to give a solid pigment dispersed composition as beads of 0.1 mm or less in particle size. The particle size of the pigment is 10µ or less, when determined on an acetone solution of the solid pigment dispersed composition. Thus, it is confirmed that coagulation has not taken place.

The solid pigment dispersed composition is treated in the same manner as in Example 1 to form a coating film. The fluidity during baking is good, and the obtained coating film is smooth and lustrous.

EXAMPLE 6

An acrylic copolyer prepared by the copolymerization of methyl methacrylate, styrene, isobutyl methacrylate, butyl acrylate and acrylic acid in a proportion of 47:23:15:10:5 by weight and having a weight average molecular weight of 21,000 (46.3 parts) is dissolved in a mixture consisting of methyl methacrylate (19.4 parts), styrene (10.6 parts), methacrylic acid (6.9 parts), glycidyl acrylate (6.9 parts) and n-butyl acrylate (2.3 parts), and powdery aluminum (7.4 parts) is dispersed therein by the aid of a mixer. To the dispersion, t-dodecylmercaptan (1.4 parts) and 2,2'-azobis-2,4-dimethylvaleronitrile (1.9 parts) are added and dissolved uniformly by the aid of a mixer. The obtained liquid composition is immediately placed into the same reaction vessel as in Example 1 in which a 0.5% by weight aqueous solution of hydroxypropylmethylcellulose (400 parts) has been previously charged. The contents are stirred under nitrogen stream to disperse the liquid composition into water. The temperature is elevated to 70° C. in 15 minutes, and stirring is continued at 70° C. for 5 hours. After cooling, the dispersed phase is collected and treated as in Example 1 to give a solid pigment dispersed composition as beads of 0.5 mm or less in particle size.

The solid pigment dispersed composition is treated in the same manner as in Example 1 to form a coating film. The fluidity during baking is good, and the obtained coating film is smooth, the powdery aluminum being uniformly dispersed.

EXAMPLE 7

Pigments as shown in Table 1 are each dispersed in a varnish (a) having the composition as shown in Table 2 by the aid of a sand grinding mill or a ball mill to make the particle size of the pigment 10μ or less. The resultant color pastes for tinting (i.e. tint pastes (L-1), (L-2), (L-3) and (L-4)) are each admixed with a varnish (b) having the composition as shown in Table 2 in a proportion as shown in Table 3 to adjust the vehicle composition to a varnish (c) having the composition as shown in Table 2. The resulting liquid compositions are each subjected to suspension polymerization and treated as in Example 1 to prepare a solid pigment dispersed composition. Each 100 parts of the thus prepared solid pigment dispersed compositions (S-1), (S-2), (S-3) and (S-4) are incorporated respectively with 9.7 parts, 10.2 parts, 11.3 parts and 11.5 parts of 1,10-decanedicarboxylic acid [hereinafter referred to as "DDA"] to make a 1:1 proportion of the epoxy groups in the said compositions and the carboxyl groups in the DDA and 1 part of a flow controlling agent, i.e. "Modaflow" (trade name; manufactured gy Monsanto Co., Ltd.) is added to each of them. The resultant mixtures are each melted and mixed uniformly by the aid of a hot roller mill maintained at 100° C. The thus obtained solid pigment dispersed compositions including DDA are respectively referred to as (S'-1), (S'-2), (S'-3) and (S'-4).

Referring to 10 GY 6/4 in "Munsell Book of Color", the solid pigment dispersed compositions (S'-1), (S'-2), (S'-3) and (S'-4) are color matched macroscopically in a hot roller mill maintained at 100° C. The color matched solid paint composition as prepared above is coated electrostatically on the surface of a steel panel and baked at 200° C. for 20 minutes. The obtained coated panel is referred to as "color standard panel [I]".

The weight ratio of the solid pigment dispersed compositions (S'-1), (S'-2), (S'-3) and (S'-4) in the color matched solid paint composition as ultimately obtained is 296.2:158.3:29.3:10.0, which corresponds to the weight ratio of the tint pastes (L-1), (L-2), (L-3) and (L-4) and the varnish (b) being 404.1:201.3:30.6:10.0:881.0.

TABLE 1

| Tint paste | (Parts by weight) | | | |
|---|---|---|---|---|
| | L - 1 | L - 2 | L - 3 | L - 4 |
| White pigment[1] | 25 | | | |
| Yellow pigment[2] | | 19.05 | | |
| Blue pigment[3] | | | 6.38 | |
| Black pigment[4] | | | | 4.17 |
| Varnish (a)[5] | 30 | 30 | 30 | 30 |
| Dispersing equipment | Sand grinding | Sand grinding | Ball mill | Ball mill |

TABLE 1-continued

| Tint paste | (Parts by weight) | | | |
|---|---|---|---|---|
| | L - 1 | L - 2 | L - 3 | L - 4 |

Note:
[1]"R-CR-3 titanium dioxide", trade name, British Titan Products Co. Ltd.
[2]"Mapicoyellow LL-XLO", trade name, Titan Kogyo K.K.
[3]"Cyanine Blue 700-8", trade name, Toyo Ink K.K.
[4]"Neo Sepectra A G Beads", trade name, Columbian Carbon Co. Ltd.
[5]as shown in TABLE 2

TABLE 2

| Varnish | (Parts by weight) | | |
|---|---|---|---|
| | (a) | (b) | (c) |
| Resin (A)[1] | 10 | 10 | 20 |
| Methyl methacrylate | | 31.5 | 31.5 |
| n-Butyl methacrylate | | 7 | 7 |
| Styrene | 20 | | 20 |
| Glycidyl methacrylate | | 16 | 16 |
| t-Dodecylmercaptan | | 1.5 | 1.5 |
| 2,2'-Azo-2,4-dimethyl valeronitrile | | 4 | 4 |

Note:
[1]as described in Example 2.

TABLE 3

| Solid pigment dispersed composition | (Parts by weight) | | | |
|---|---|---|---|---|
| | S - 1 | S - 2 | S - 3 | S - 4 |
| L - 1 | 55 | | | |
| L - 2 | | 49.1 | | |
| L - 3 | | | 36.4 | |
| L - 4 | | | | 34.2 |
| Varnish (b) | 70 | 70 | 70 | 70 |
| Pigment content (weight %) | 20 | 16 | 6 | 4 |

EXAMPLE 8

According to the weight proportion of the tint pastes (L-1), (L-2), (L-3) and (L-4) and the varnish (b) as determined in Example 7, there is prepared a color matched liquid composition by admixing the tint paste (L-1) (404.1 parts), the tint paste (L-2) (201.3 parts), the tint paste (L-3) (30.6 parts), the tint paste (L-4) (10.0 parts) and the varnish (b) (881 parts). This liquid composition is then subjected to suspension polymerization and treated as in Example 1 to give a color matched solid pigment dispersed composition. This solid composition (100 parts) is admixed uniformly with DDA (10.1 parts) and "Modaflow" (1 part) in a hot roller mill maintained at 100° C. to make a color matched solid paint composition, which has the same weight proportion as determined in Example 7.

The color matched solid paint composition thus prepared is coated electrostatically on the surface of a steel panel and baked at 200° C. for 20 minutes. The obtained coated panel is referred to as "color standard panel [III]".

The color difference between the color standard panel [I] and the color standard panel [III] is 0.4 NBS units when determined by the use of a digital color and color difference computer manufactured by Toyo Rika Ind. Co., Ltd.

EXAMPLES 9 TO 12

According to the conditions as shown in Table 4, the color matched solid paint composition is prepared, and the coating is effected to prepare a coated panel, which is referred to as "color standard panel [II]". In Example 9, the liquid composition prepared from the materials as shown in Table 4 is admixed with lacquer thinner to make a viscosity of 20 seconds in Ford Cup No. 4 and then used for coating.

TABLE 4

| Example | (Parts by weight) | | | |
|---|---|---|---|---|
| | 9 | 10 | 11 | 12 |
| Color matched tint paste[1] | 100 | 100 | 100 | 64.6 |
| Varnish (b)[2] | | | | 88.1[9] |
| Varnish (d)[3] | 78 | | | |
| Varnish (e)[4] | | 50 | | |
| Varnish (f)[5] | | 15 | | |
| Varnish (g)[6] | | | 48 | |
| Additive[7] | 0.005 | 0.005 | 0.005 | 0.005 |
| "Modaflow" BME[8] | | | | 3 |
| State of paint composition | Liquid | Liquid | Liquid | Liquid |
| Coating equipment | Air-spray gun | Doctor blade | Doctor blade | Doctor blade |
| Curing condition | 100° C. 20 min. | 140° C. 20 min. | 200° C. 20 min. | Irradiated at a distance of 15 cm from a high pressure mercury-vapor lamp for 3 minutes |

Note:
[1] the same composition as in Example 8.
[2] as shown in TABLE 2.
[3] air drying acrylic lacquer varnish (non-volatile components, 50% by weight).
[4] alkyd resin having hydroxyl groups modified with 38% by weight of tall oil fatty acid in excess (non-volatile components, 60%).
[5] melamine-formaldehyde resin, i.e. "Super Beckamine J-820" (trade name; manufactured by Dai Nippon Ink Ind. Co., Ltd.; non-volatile components. 60%).
[6] varnish consisting of the resin obtained by suspension polymerization of the varnish (c) in TABLE 2 (100 parts), DDA (12.3 parts) and dimethylformamide (28.1 parts).
[7] "Silicon additive R-12" (trade name; manufactured by Union Carbide Co.).
[8] benzoin methyl ether.
[9] varnish having the composition of the varnish (b) excluding t-dodecylmercaptan and 2,2'-azo-2,4-dimethylvaleronitrile therefrom.

EXAMPLE 13

The tint pastes (L-1), (L-2), (L-3) and (L-4) are prepared as in Example 7, and they are admixed together with the varnish (b) as in Example 8 to make a color matched liquid composition. A portion of the color matched liquid composition is processed according to the condition as shown in Table 4 for Example 9 and then applied on the surface of a steel panel. The thus obtained coated panel for color inspection is compared macroscopically with the color standard panel [II] as previously prepared. Since the green color is a little insufficient, small amounts of the tint pastes (L-2) and (L-3) are added to the above prepared color matched liquid composition, and the resultant composition is processed and coated on the surface of a steel panel as above. The thus obtained coated panel for color inspection is macroscopically confirmed to have the substantially same color as the color standard panel [II]. The color difference between them is 0.3 NBS units when determined by the use of a digital color and color difference computer manufactured by Toyo Rika Ind. Co., Ltd. The weight ratio of the tint pastes (L-1), (L-2), (L-3) and (L-4) in the color matched liquid composition used for the preparation of the latter coated panel for color inspection is 404.1:203.4:31.0:10.0.

The color matched liquid composition as ultimately obtained above (648.5 parts) is admixed uniformly with the varnish (b) (888 parts) to adjust the vehicle composition to the varnish (c). The resulting liquid composition are subjected to suspension polymerization as shown in Example 1 to give a color matched solid pigment dispersed composition. As in Example 8, this solid composition is admixed with DDA and "Modaflow" to make a color matched solid paint composition and the color matched solid paint composition is coated electrostatically on the surface of a steel panel. The color difference between the coated panel for color inspection thus prepared and the color standard panel [III] is 0.6 NBS units when determined by the use of a digital color and color difference computer manufactured by Toyo Rika Ind. Co., Ltd.

What is claimed is:

1. A process for preparing a solid pigment dispersed composition which comprises subjecting
   A. a liquid composition comprising:
      i. at least one ethylenically unsaturated polymerizable compound selected from the group consisting of monovinyl aromatic hydrocarbons, ethylenically unsaturated carboxylic esters, acrylonitrile, methacrylonitrile, glycidyl vinyl compounds, ethylenically unsaturated compounds having at least one hydroxyl group, ethylenically unsaturated carboxylic acids, ethylenically unsaturated amides and ethylenically unsaturated compounds having at least one blocked isocyanate group, and
      ii. at least one resin dissolved or dispersed therein, said resin being selected from the group consisting of natural resins, rosin esters, cellulose acetate, cellulose acetate butyrate, cellulose acetate propionate, cellulose methyl ether, cellulose ethyl ether, xylene resins, toluene resins, petroleum resins, silicon resins, polyurethane resins, phenol resins, aminoplast resins, epoxy resins, blocked polyisocyanate resins, acrylic resins, methacrylic resins and alkyd resins having at least one mercapto group to be grafted with the ethylenically unsaturated compound, and
   B. at least one pigment dispersed in said liquid composition,
   to suspension or bulk polymerization to form a reaction mixture and recovering the product from suspension or bulk polymerization reaction mixture, the suspension polymerization being performed in the presence of a suspension stabilizer to produce a spherical particulate product,
   said liquid composition being color matched to said pigment before said suspension or bulk polymerization.

2. The process according to claim 1, wherein the resin is an alkyd resin having at least one mercapto group to be grafted with the ethylenically unsaturated compound.

3. The process according to claim 1, wherein the mercapto group is the one introduced by reacting a hydroxyl group with the carboxyl group in a mercaptocarboxylic acid.

4. The process according to claim 1, wherein the mercaptocarboxylic acid is thioglycollic acid.

5. The process according to claim 1, wherein the ethylenically unsaturated compound is used in an amount of 27 to 96% by weight on the basis of the weight of the liquid composition.

6. The process according to claim 1, wherein the resin is used in an amount of 3 to 60% by weight on the basis of the weight of the liquid composition.

7. The process according to claim 1, wherein the pigment is used in an amount of 1 to 70% by weight on the basis of the weight of the liquid composition.

8. The process according to claim 1, wherein the polymerization is suspension polymerization.

9. The process according to claim 1, wherein the polymerization is carried out in the presence of a polymerization initiator.

10. The process according to claim 9, wherein the polymerization is carried out in the presence of a chain transfer agent.

11. The process according to claim 1, wherein the color matching is made to a supplementary color standard previously prepared by the same process as used for preparation of a coating film for color inspection, which comprises applying a paint containing the liquid composition on a substrate and drying or curing the same.

12. The process according to claim 11, wherein the curing is effected by heating.

13. The process according to claim 11, wherein the curing is effected by ultraviolet ray irradiation.

14. The process according to claim 11, wherein the curing is effected by electron beam radiation.